C. W. HARPER.
SPOON HOLDING CLIP.
APPLICATION FILED FEB. 18, 1919.

1,312,396.

Patented Aug. 5, 1919.

Witnesses
R. A. Thomas

Inventor
Charles W. Harper
By Victor J. Evans
Attorney

UNITED STATES PATENT OFFICE.

CHARLES W. HARPER, OF SPRING VALLEY, NEW YORK.

SPOON-HOLDING CLIP.

1,312,396.  Specification of Letters Patent.  Patented Aug. 5, 1919.

Application filed February 18, 1919. Serial No. 277,763.

*To all whom it may concern:*

Be it known that I, CHARLES W. HARPER, a citizen of the United States, residing at Spring Valley, in the county of Rockland and State of New York, have invented new and useful Improvements in Spoon-Holding Clips, of which the following is a specification.

This invention relates to spoon attachments and has for its object the provision of a clip adapted for association with a spoon and engageable with the edge of a cooking vessel or dish whereby the spoon may be disposed within the vessel or dish with its handle portion firmly held in respect to the edge so that the spoon will be prevented from slipping bodily into the receptacle.

An important object is the provision of a device of this character which is so constructed that it will be resiliently engaged upon the handle of a spoon so that certain portions of the device will exert a clamping action for preventing displacement of the device.

A further object is the provision of a device of this character which is formed from a single strip of material and which will be consequently simple and inexpensive in manufacture, which will be efficient and durable in use and a general improvement in the art.

With the above and other objects and advantages in view, the invention consists in the details of construction to be hereinafter more fully described and claimed, and illustrated in the accompanying drawings, in which—

Figure 1:
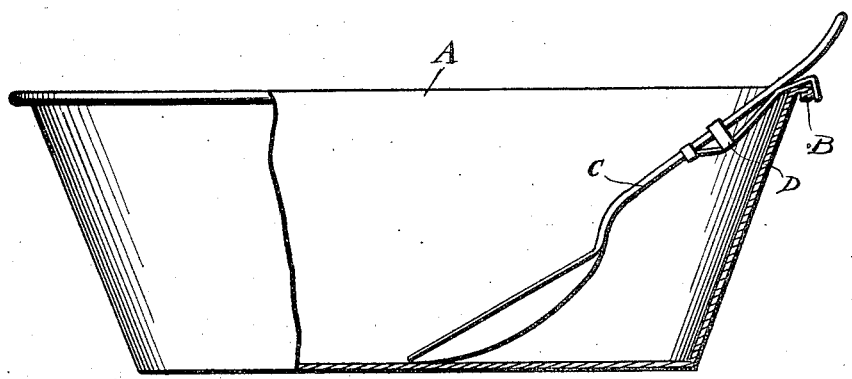
Figure 1 is a side elevation of the device applied to a spoon, the spoon being shown associated with a cooking pan.
Figure 2:
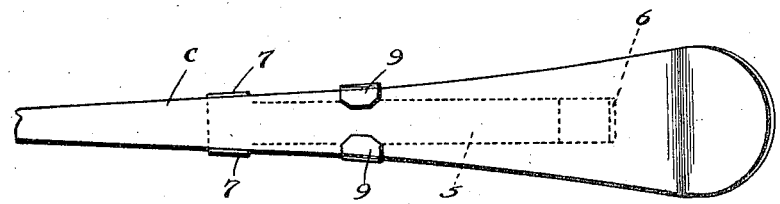
Fig. 2 is a plan view of the handle of the spoon showing the device in position and Fig. 3 is a perspective view of the clip detached.
Figure 3:
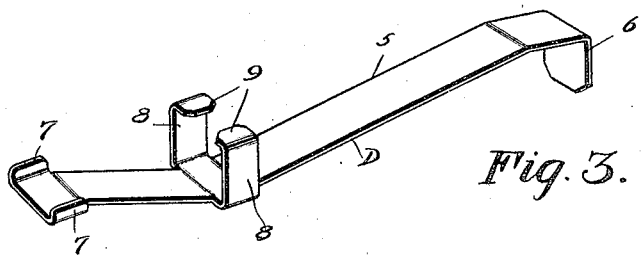

Referring more particularly to the drawing the letter A designates a pan having a flange B and within which it is desired to dispose the spoon C. As is well known it is a difficult matter to so dispose a spoon within a pan that the spoon will not slip down into the contents of the pan.

In carrying out my invention I provide a clip designated broadly by the letter D which is formed preferably from a single piece of material such as spring steel, brass or the like, and which comprises an angular body portion 5 terminating at one end in a hook 6 and provided at the sides of its opposite end with guide flanges 7 which extend at right angles to the body 5. Intermediate its ends, the body 5 has formed thereon a pair of tongues 8 which are bent to extend at right angles to the body and in spaced parallel relation to each other, these tongues terminating at their ends in retaining flanges 9.

The device is attached to the spoon by slightly turning the handle portion of the spoon so that the narrow portion thereof may be passed between the retaining flanges 9 and engaged between the tongues 8, after which the device is slid along the handle of the spoon toward its wider end until the tongues 8 and the flanges 7 engage firmly against the edges thereof. The device will then have the appearance clearly shown in Fig. 1 and will be firmly held with respect to the handle of the spoon, the hook 6 projecting from the rear of the spoon. When the spoon thus equipped is placed within the pan A the hook 6 is engaged over the edge of the flange B whereupon the spoon will be held firmly associated with the flange of the pan and will be prevented from slipping down into the contents thereof.

From the foregoing description and a study of the drawing it will be apparent that I have thus provided an extremely simple and inexpensive device for the purpose specified which will efficiently perform all the functions for which it is intended and which will consequently be an improvement in the art.

Having thus described my invention I claim:—

A spoon attachment comprising a body of resilient material, guide flanges formed on the side edges of said body at one end thereof and engageable with the side edges of a spoon handle, a pair of tongues formed on opposite edges of said body intermediate the ends thereof and extending in substantially parallel relation to each other at right angles to the upper surface of said body, said tongues terminating at their free ends in inwardly directed retaining flanges engageable with the handle of the spoon, said body being slightly angular longitudinally whereby to cause said last named flanges to resiliently engage the spoon handle, and a hook formed on the other end of said body and engageable over the flange of a vessel.

In testimony whereof I affix my signature.

CHARLES W. HARPER.

Copies of this patent may be obtained for five cents each, by addressing the "Commissioner of Patents, Washington, D. C."